US012571132B2

(12) United States Patent　　　(10) Patent No.:　US 12,571,132 B2
Lee　　　　　　　　　　　　　　　 (45) Date of Patent:　　Mar. 10, 2026

(54) MANUFACTURING METHOD AND SYSTEM OF FIBER

(71) Applicant: QUANN CHENG INTERNATIONAL CO., LTD., Pingtung City (TW)

(72) Inventor: Hsing-Hsun Lee, Kaohsiung City (TW)

(73) Assignee: QUANN CHENG INTERNATIONAL CO., LTD., Pingtung City (TW)

( * ) Notice: Subject to any disclaimer, the term of this patent is extended or adjusted under 35 U.S.C. 154(b) by 128 days.

(21) Appl. No.: 18/416,897

(22) Filed: Jan. 19, 2024

(65) Prior Publication Data

US 2024/0158956 A1　　May 16, 2024

Related U.S. Application Data

(63) Continuation-in-part of application No. 17/527,171, filed on Nov. 16, 2021, now abandoned.

(30) Foreign Application Priority Data

Oct. 8, 2021　(TW) .................................. 110137574

(51) Int. Cl.
　　B29C 48/05　　　(2019.01)
　　B29C 48/00　　　(2019.01)
　　　　　　　(Continued)

(52) U.S. Cl.
　　CPC ............ D01F 1/10 (2013.01); B29C 48/0018 (2019.02); B29C 48/287 (2019.02);
　　　　　　　(Continued)

(58) Field of Classification Search
　　CPC ......... B29B 7/40; B29B 7/726; B29B 13/021; B29B 13/022; B29C 2035/0211; B29C 2035/0811; B29C 2035/0816; B29C 48/0018; B29C 48/05; B29C 48/287; B29C 48/29; B29C 48/793; B29C 48/802;
(Continued)

(56) References Cited

U.S. PATENT DOCUMENTS

| | | | | |
|---|---|---|---|---|
| 3,698,844 | A | * | 10/1972 | Grimm ................... B29C 48/92 |
| | | | | 425/144 X |
| 2016/0340809 | A1 | * | 11/2016 | Fisher ..................... D01F 1/103 |
| 2020/0385547 | A1 | * | 12/2020 | Sugawara .............. D06M 11/76 |

FOREIGN PATENT DOCUMENTS

CN　　　　101985781 B　 *　3/2012　 ............... D01D 5/12

OTHER PUBLICATIONS

Translation of CN 101985781 B (published on Mar. 28, 2012).*

* cited by examiner

*Primary Examiner* — Leo B Tentoni
(74) *Attorney, Agent, or Firm* — Leong C. Lei

(57)　　　　　ABSTRACT

A manufacturing method of a fiber includes: mixing and stirring a plurality of raw materials, to form a mixed liquid, where the plurality of raw materials includes dry copper nanopowder with a particle size not more than 48 nm, a fiber slurry, and an additive; drying the mixed liquid, to remove moisture of the mixed liquid and form a processed raw material; heating the processed raw material, to make the processed raw material be in a semi-molten state; electrifying the processed raw material in the semi-molten state, and then extruding at least one fibril from the processed raw material in the semi-molten state; stretching the at least one fibril; and performing cooling and shaping on at least one stretched fibril, to form a final fiber product.

9 Claims, 3 Drawing Sheets

(51) Int. Cl.

| | |
|---|---|
| *B29C 48/285* | (2019.01) |
| *B29C 48/29* | (2019.01) |
| *B29C 48/793* | (2019.01) |
| *B29C 48/80* | (2019.01) |
| *B29C 48/92* | (2019.01) |
| *D01D 1/02* | (2006.01) |
| *D01D 1/04* | (2006.01) |
| *D01D 4/02* | (2006.01) |
| *D01D 5/00* | (2006.01) |
| *D01D 5/08* | (2006.01) |
| *D01D 5/16* | (2006.01) |
| *D01D 10/00* | (2006.01) |
| *D01F 1/10* | (2006.01) |
| *D02J 13/00* | (2006.01) |
| *B29C 35/02* | (2006.01) |
| *B29C 35/08* | (2006.01) |
| *B29K 105/00* | (2006.01) |
| *B29K 105/16* | (2006.01) |
| *B29K 505/10* | (2006.01) |

(52) U.S. Cl.
CPC .......... *B29C 48/802* (2019.02); *B29C 48/832* (2019.02); *D01D 1/02* (2013.01); *D01D 5/0023* (2013.01); *D01D 10/00* (2013.01); *B29C 2035/0211* (2013.01); *B29C 2035/0811* (2013.01); *B29C 2035/0816* (2013.01); *B29C 2948/92209* (2019.02); *B29C 2948/924* (2019.02); *B29K 2105/0029* (2013.01); *B29K 2105/0041* (2013.01); *B29K 2105/162* (2013.01); *B29K 2505/10* (2013.01); *D01F 1/103* (2013.01)

(58) Field of Classification Search
CPC ................. B29C 48/832; B29C 48/92; B29C 2948/92209; B29C 2948/924; B29K 2105/0029; B29K 2105/0041; B29K 2105/162; B29K 2505/10; D01D 1/04; D01D 4/02; D01D 5/08; D01D 5/12; D01D 5/16; D01F 1/103; D02J 13/00
USPC ..... 264/210.6, 210.8, 211, 211.14, 402, 403, 264/404, 464; 425/66, 71, 135, 144, 377, 425/378.2, 379.1, 382.2, 461, 464
See application file for complete search history.

MANUFACTURING METHOD AND SYSTEM OF FIBER

BACKGROUND

Technical Field

The present invention mainly relates to a manufacturing method of a fiber, and particularly relates to a manufacturing method and system of a fiber, where copper nanopowder is used as a processed raw material, and the processed raw material is covered with a magnetic field, to further adjust a wavelength of a far infrared ray emitted by a manufactured final product.

Related Art

With the improvement of people's living standard and the rise in health awareness, customers and the market are paying increasing attention to functional textiles with antibacterial, anti-mildew, and deodorant effects and the like. In a conventional manufacturing method of a functional fiber including a metal material, after a metal material and an adhesive are mixed, the fiber surface can be directly coated with the mixture to make a fiber with a far infrared function.

However, in the foregoing conventional manufacturing method of a fiber, the stickiness of the adhesive will decrease over time. As a result, the content of the metal material on the fiber surface gradually decreases as well. Consequently, the far infrared effect of textiles including the fiber is reduced.

In view of this, it is necessary to provide a fiber with metal ions excited by luminous energy and a manufacturing method thereof, to resolve the foregoing problem.

SUMMARY

An objective of the present invention is to provide a manufacturing method of a fiber excited by luminous energy of metal ions, where copper nanopowder is used as a processed raw material, and the processed raw material is covered with a magnetic field, to further adjust a wavelength of a far infrared ray emitted by a manufactured final product.

Another objective of the present invention is to provide a manufacturing system of a fiber, to manufacture a final fiber product with the foregoing manufacturing method of a fiber.

To achieve the foregoing objectives, the present invention provides a manufacturing method of a fiber, comprising: mixing and stirring a plurality of raw materials, to form a mixed liquid, where the plurality of raw materials comprises dry copper nanopowder with a particle size not more than 48 nm, a fiber slurry, and an additive; drying the mixed liquid, to remove moisture of the mixed liquid and form a processed raw material; heating the processed raw material, to make the processed raw material be in a semi-molten state; electrifying the processed raw material in the semi-molten state, and then extruding at least one fibril from the processed raw material in the semi-molten state; stretching the at least one fibril; and performing cooling and shaping on at least one stretched fibril, to form a final fiber product.

In some embodiments, the additive comprises an ionic liquid (IL).

In some embodiments, the additive further comprises a plurality of thermoplastic polyurethane (TPU) colloidal particles.

In some embodiments, the TPU colloidal particles is TPU.

In some embodiments, the mixed liquid is dried at a drying temperature in a range of 100° C. to 150° C., and a drying time is set to 48 hours.

In some embodiments, the processed raw material in the semi-molten state is electrified with power of 1500 watts, and a charging time is at least 24 hours.

The present invention further provides a manufacturing system of a fiber, comprising: a stirring device, configured to mix and stir a plurality of raw materials, to form a mixed liquid, where the plurality of raw materials comprises dry copper nanopowder with a particle size not more than 48 nm, a fiber slurry, and an additive; a drying device, connected to the stirring device and configured to dry the mixed liquid, to remove moisture of the mixed liquid and form a processed raw material; a spinning device, comprising a material inlet, a heating area, an electrifying area, and a material outlet, where the material inlet is in communication with the stirring device, for the processed raw material to flow to the heating area, the heating area and the electrifying area are disposed between the material inlet and the material outlet, the heating area is provided with at least one heater, configured to heat the processed raw material, to make the processed raw material be in a semi-molten state, the electrifying area is provided with a plurality of metal sheets, configured to form a magnetic field covering the processed raw material in the semi-molten state after electrification, the material outlet is in communication with a spinning box, and the bottom of the spinning box is provided with a spinning plate, configured to extrude at least one fibril; a stretching device, disposed adjacent to the spinning plate, and comprising a plurality of rollers, configured to stretch the at least one fibril; a shaping device, disposed adjacent to the stretching device, and configured to perform cooling and shaping on at least one stretched fibril, to form a final fiber product; and an electrical control device, comprising a microcontroller unit, and electrically connected to the stirring device, the drying device, the at least one heater, the plurality of metal sheets, the plurality of rollers, and the shaping device, where the microcontroller unit is configured to control a heating temperature of the at least one heater and control a charging wattage and a charging time of the plurality of metal sheets, to convert, after the final fiber product absorbs external energy, the external energy into a far infrared ray in a corresponding wavelength range.

In some embodiments, the stirring device comprises a hopper and a mixer, the hopper is configured to pour the plurality of raw materials, the mixer is disposed at the bottom of the hopper and is electrically connected to the microcontroller unit, and the mixer is configured to stir and mix the plurality of raw materials, to form the mixed liquid.

In some embodiments, the spinning box further comprises a material injection opening, configured to inject a plurality of TPU colloidal particles into the spinning box.

In some embodiments, the charging wattage of the plurality of metal sheets is 1500 watts, and the charging time is at least 24 hours.

The manufacturing method and system of a fiber of the present invention have the following characteristics. The copper nanopowder, the fiber slurry, and the additive are mixed to form the final fiber product, and in a process of manufacturing the final fiber product, the processed raw material is heated, to electrify the processed raw material after being in the semi-molten state. Therefore, by controlling the charging wattage and the charging time, the final fiber product is enabled to emit a far infrared ray in a specific wavelength range after absorbing external energy. Therefore, based on the manufacturing method and system of a fiber of the present invention, the additive is less likely to fall off compared with an additive attached to the fiber surface by using an adhesive in a conventional process. In addition, the manufacturing method and system of a fiber of the present invention can extend the deodorant and antibacterial effects and improve human health.

DETAILED DESCRIPTION

Embodiments of the present invention are described in detail below with reference to the accompanying drawings. The accompanying drawings are mainly simplified schematic diagrams, which merely schematically illustrate the basic structure of the present invention. Therefore, only elements related to the present invention are indicated in the accompanying drawings, and the elements shown are not drawn in terms of the number, shape, size ratio, and the like during the implementation. The specification and size during the actual implementation are indeed an optional design, and the element layout and form may be more complicated.

The following embodiments are described with reference to the accompanying drawings, which are used to exemplify specific embodiments for implementation of the present invention. Terms about directions mentioned in the present invention, such as "on", "below", "front", and "back" merely refer to directions in the accompanying drawings. Therefore, the used terms about directions are used to describe and understand this application, and are not intended to limit this application. In addition, throughout this specification, unless otherwise explicitly described to have an opposite meaning, the term "include" is understood as including the element, but not excluding any other element.

Figure 1:
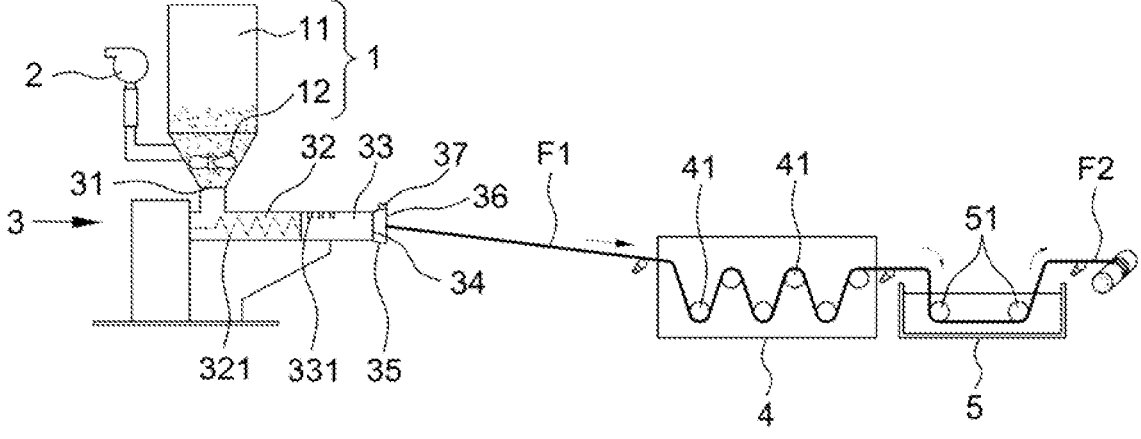
FIG. 1 is a device system diagram of a manufacturing system of a fiber according to the present invention.
Figure 2:
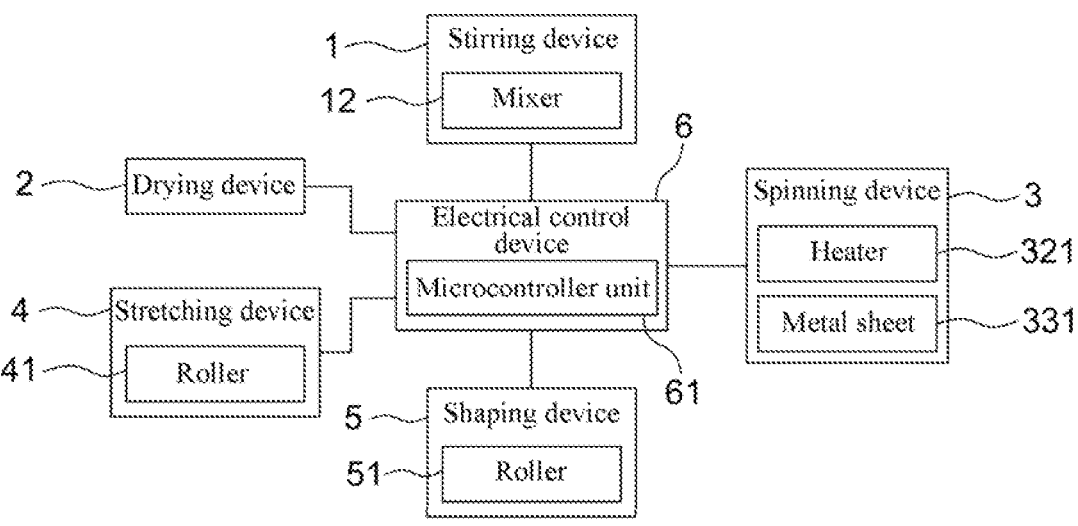
FIG. 2 is a system block diagram of the manufacturing system of a fiber according to the present invention.

FIG. 1 and FIG. 2 are a device system diagram and a system block diagram of a manufacturing system of a fiber according to the present invention respectively. The manufacturing system of a fiber includes: a stirring device 1, a drying device 2, a spinning device 3, at least one stretching device 4, a shaping device 5, and an electrical control device 6. The stirring device 1, the drying device 2, the spinning device 3, the stretching device 4, and the shaping device 5 are separately electrically connected to the electrical control device 6.

The stirring device 1 is configured to mix and stir a plurality of raw materials, to form a mixed liquid. Specifically, the stirring device 1 includes a hopper 11 and a mixer 12. The hopper 11 is configured to pour the plurality of raw materials. In this embodiment, the plurality of raw materials includes dry copper nanopowder with a particle size not more than 48 nm, a fiber slurry, and an additive.

Continuing from the above, for example, the copper nanopowder (QF-NCu-35) may have a specific surface area of 30 to 70 m2/g, may have an apparent density of 0.15 to 0.35 g/cm3, and may be in a spherical shape. The fiber slurry may optionally include at least one fiber of a cotton fiber, a polyester fiber, a viscose fiber, a Modal fiber, an ultra-high-molecular-weight polyethylene fiber, a polypropylene fiber, an aromatic polyamide fiber, a polyamide fiber, a polyethylene terephthalate fiber, a polyethylene naphthalate fiber, an extended-chain polyvinyl alcohol fiber, an extended-chain polyacrylonitrile fiber, a polybenzoxazole fiber, a polybenzothiazole fiber, a liquid crystal copolyester fiber, a rigid rod fiber, a glass fiber, a structural glass fiber, and a resistant glass fiber. The additive includes an IL and a plurality of TPU colloidal particles. The TPU colloidal particles may be TPU.

The mixer 12 is disposed at the bottom of the hopper 11 and is electrically connected to the electrical control device 6, and the mixer 12 is configured to stir and mix the plurality of raw materials, to form the mixed liquid. In this embodiment, the mixer 12 is a stirring blade.

The drying device 2 is connected to the stirring device 1 and configured to dry the mixed liquid, to remove moisture of the mixed liquid and form a processed raw material. In this embodiment, the drying device 2 is a drier.

The spinning device 3 includes a material inlet 31, a heating area 32, an electrifying area 33, and a material outlet 34. The material inlet 31 is in communication with the stirring device 1, for the processed raw material to flow to the heating area 32. The heating area 32 and the electrifying area 33 are disposed between the material inlet 31 and the material outlet 34. The heating area 32 includes at least one heater 321, electrically connected to the electrical control device 6 and configured to heat the processed raw material, to make the processed raw material be in a semi-molten state. In addition, the electrifying area 33 includes a plurality of metal sheets 331, electrically connected to the electrical control device 6 and configured to form a magnetic field covering the processed raw material in the semi-molten state after electrification. The material outlet 34 is in communication with a spinning box 35, and the bottom of the spinning box 35 includes a spinning plate 36, configured to extrude at least one fibril F1.

Preferably, the spinning box 35 further includes a material injection opening 37, configured to inject a plurality of TPU colloidal particles into the spinning box 35. Therefore, the plurality of TPU colloidal particles may be attached onto an outer circumferential surface of the fibril F1, to partially or completely coat the fibril F1.

Specifically, the spinning device 3 is an extruder extruding the processed raw material toward the material outlet 34 using a screw, to make the processed raw material flow into the spinning box 35. The spinning plate 36 may include a plurality of circular holes, and apertures of all the plurality of circular holes are consistent. Therefore, when the processed raw material in the semi-molten state is extruded to pass through the plurality of circular holes, a plurality of fibrils F1 may be formed.

The stretching device 4 is disposed adjacent to the spinning plate 36 of the spinning device 3, and includes a plurality of rollers 41 disposed at fixed intervals and in a regular arrangement, and the plurality of rollers 41 is configured to stretch the at least one fibril F1.

The shaping device 5 is disposed adjacent to the stretching device 4, and configured to perform cooling and shaping on at least one stretched fibril F1, to form a final fiber product F2. Specifically, the shaping device 5 drives the at least one stretched fibril F1 using the plurality of rollers 51, and performs cooling using a cooling liquid, to shape the inside and the surface of the at least one stretched fibril F1, to form the final fiber product F2. In this embodiment, the cooling liquid is water or oil.

In this embodiment, the electrical control device 6 is an industrial personal computer, and includes a microcontroller unit 61, electrically connected to the mixer 12, the drying device 2, the at least one heater 321, the plurality of metal sheets 331, the plurality of rollers 41, and the plurality of rollers 51 of the shaping device 5. In this embodiment, the microcontroller unit 61 may be any electronic apparatus with operation and signal generation functions, for example, a programmable logic controller (PLC), a digital signal processor (DSP), or a circuit board with the foregoing functions.

Specifically, the microcontroller unit 61 is configured to set a drying temperature and a drying time of the drying device 2 to a range of 100 to 150° C. and 48 hours respectively. Furthermore, the microcontroller unit 61 controls a heating temperature of the at least one heater 321, and controls a charging wattage and a charging time of the plurality of metal sheets 331.

Figure 3:
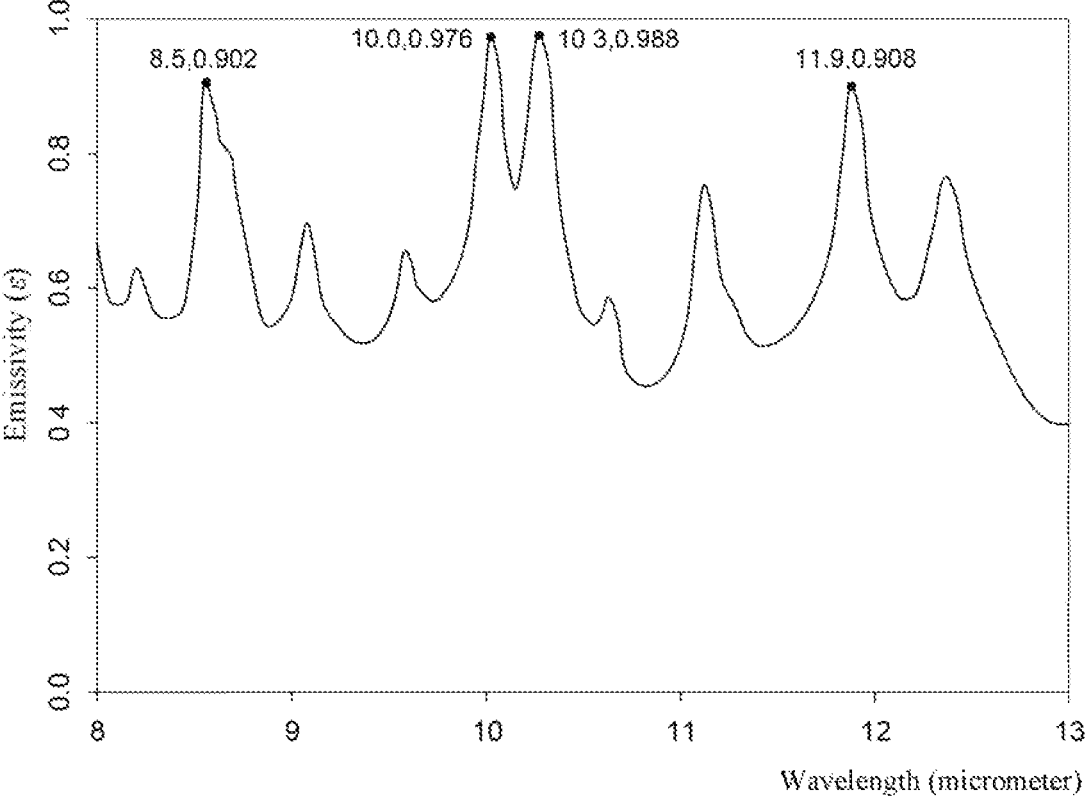
FIG. 3 is a diagram of a far infrared ray emissivity of a final fiber product manufactured by the manufacturing system of a fiber according to the present invention.

FIG. 3 is a diagram of a far infrared ray emissivity of a final fiber product manufactured by the manufacturing system of a fiber according to the present invention. In this embodiment, the charging wattage of the plurality of metal sheets 331 is 1500 watts, and the charging time is at least 24 hours. Therefore, after the final fiber product F2 receives external energy, the external energy can be optimally converted into a far infrared ray whose wavelength is 10.3 micrometers and whose far infrared ray emissivity reaches 0.988.

It is worth mentioning that, the microcontroller unit 61 may start electrifying the plurality of metal sheets 331 when the heating temperature of the at least one heater 321 is in a range of 30 to 60° C. In addition, when the charging time is longer, a time of the far infrared ray released by the final fiber product F2 can be relatively prolonged. For example, when charging times are 24 hours, 48 hours, and 72 hours respectively, times of the far infrared ray released by the final fiber product F2 are 1 year, 2 years, and 3 years respectively.

Figure 4:
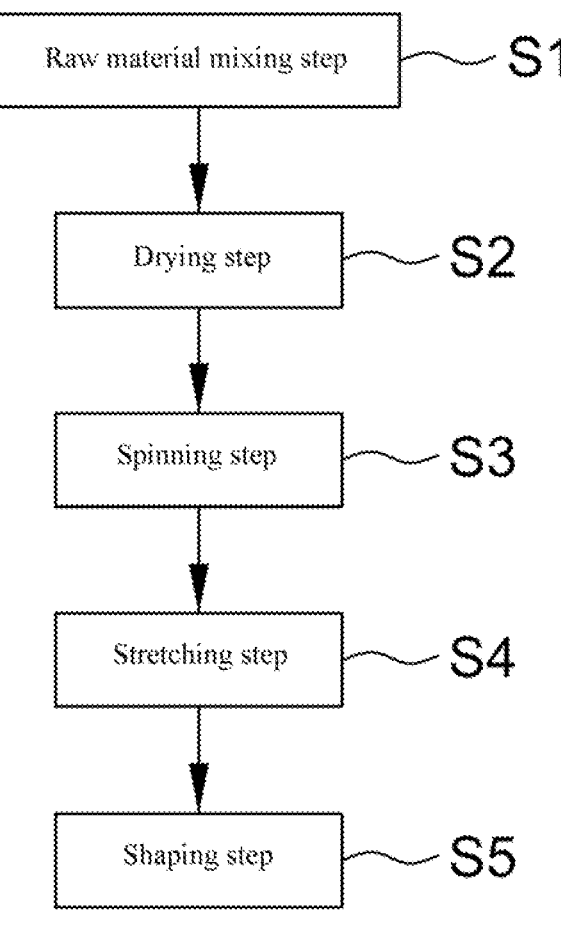
FIG. 4 is a flowchart of steps of a manufacturing method of a fiber according to the present invention.

FIG. 4 is a flowchart of steps of a manufacturing method of a fiber according to the present invention, including the following steps:

Raw material mixing step S1: Mix and stir a plurality of raw materials, to form a mixed liquid. In this embodiment, the plurality of raw materials includes dry copper nanopowder with a particle size not more than 48 nm, a fiber slurry, and an additive.

Continuing from the above, for example, the copper nanopowder (QF-NCu-35) may have a specific surface area of 30 to 70 m²/g, may have an apparent density of 0.15 to 0.35 g/cm³, and may be in a spherical shape. The fiber slurry may optionally include at least one fiber of a cotton fiber, a polyester fiber, a viscose fiber, a Modal fiber, an ultra-high-molecular-weight polyethylene fiber, a polypropylene fiber, an aromatic polyamide fiber, a polyamide fiber, a polyethylene terephthalate fiber, a polyethylene naphthalate fiber, an extended-chain polyvinyl alcohol fiber, an extended-chain polyacrylonitrile fiber, a polybenzoxazole fiber, a polybenzothiazole fiber, a liquid crystal copolyester fiber, a rigid rod fiber, a glass fiber, a structural glass fiber, and a resistant glass fiber. The additive includes an IL and a plurality of TPU colloidal particles. The TPU colloidal particles may be TPU, polyethylene, polypropylene, polyethylene terephthalate, polyamide, polybutylene terephthalate, ethylene-vinyl acetate copolymer, or nylon.

Drying step S2: Dry the mixed liquid, to remove moisture of the mixed liquid and form a processed raw material. Specifically, the mixed liquid may be poured into the foregoing hopper 11, and the foregoing drying device 2 dries the mixed liquid at a drying temperature in a range of 100 to 150° C. In addition, a drying time of the drying device 2 for the mixed liquid may be set to 48 hours, but the present invention is not limited thereto.

Spinning step S3: Input the processed raw material into the foregoing spinning device 3, and heat the processed raw material using the spinning device 3, to make the processed raw material be in a semi-molten state. Then, the spinning device 3 electrifies the processed raw material in the semi-molten state, and then extrudes at least one fibril F1 from the processed raw material in the semi-molten state.

Continuing from the above, in this embodiment, the spinning device 3 electrifies the processed raw material in the semi-molten state with power of 1500 watts, and a charging time is at least 24 hours.

Stretching step S4: Stretch the at least one fibril F1 using the plurality of rollers 41 of the foregoing stretching device 4.

Shaping step S5: Perform cooling and shaping on at least one stretched fibril F1 using the foregoing shaping device 5, to form a final fiber product F2. For example, but without limitation, the at least one stretched fibril F1 can be cooled through natural air cooling, water cooling, or the like, to perform shaping on the inside and the surface of the at least one fibril F1. In addition, the final fiber product F2 can be wound around a drum in a coiling manner.

In conclusion, based on the manufacturing method and system of a fiber of the present invention, the copper nanopowder, the fiber slurry, and the additive are mixed to form the final fiber product, and in a process of manufacturing the final fiber product, the processed raw material is heated, to electrify the processed raw material after being in the semi-molten state. Therefore, by controlling the charging wattage and the charging time, the final fiber product is enabled to emit a far infrared ray in a specific wavelength range after absorbing external energy. Therefore, based on the manufacturing method and system of a fiber of the present invention, the additive is less likely to fall off compared with an additive attached to the fiber surface by using an adhesive in a conventional process. In addition, the manufacturing method and system of a fiber of the present invention can extend the deodorant and antibacterial effects and improve human health.

The implementation forms disclosed above are merely exemplary descriptions of the principle, features, and effects of the present invention, and are not intended to limit the implementable scope of the present invention. Any person skilled in the art can make modifications and changes to the foregoing implementation forms without departing from the spirit and scope of the present invention. Any equivalent change and modification made using the contents disclosed in the present invention should still fall within the scope of the following claims.

What is claimed is:

1. A manufacturing method of a fiber, comprising:
mixing and stirring a plurality of raw materials, to form a mixed liquid, wherein the plurality of raw materials comprises dry copper nanopowder with a particle size not more than 48 nm, a fiber slurry, and an additive;
drying the mixed liquid, to remove moisture of the mixed liquid and form a processed raw material;
heating the processed raw material, to make the processed raw material be in a semi-molten state;
electrifying the processed raw material in the semi-molten state, and then extruding at least one fibril from the processed raw material in the semi-molten state;

stretching the at least one fibril; and performing cooling and shaping on at least one stretched fibril, to form a final fiber product;

the additive further comprises a plurality of thermoplastic polyurethane (TPU) colloidal particles.

2. The manufacturing method of a fiber according to claim 1, wherein the additive comprises an ionic liquid (IL).

3. The manufacturing method of a fiber according to claim 1, wherein the TPU colloidal particles is TPU.

4. The manufacturing method of a fiber according to claim 1, wherein the mixed liquid is dried at a drying temperature in a range of 100° C. to 150° C., and a drying time is set to 48 hours.

5. The manufacturing method of a fiber according to claim 1, wherein the processed raw material in the semi-molten state is electrified with power of 1500 watts, and a charging time is at least 24 hours.

6. A manufacturing system of a fiber, comprising:

a stirring device, configured to mix and stir a plurality of raw materials, to form a mixed liquid, wherein the plurality of raw materials comprises dry copper nano-powder with a particle size not more than 48 nm, a fiber slurry, and an additive;

a drying device, connected to the stirring device and configured to dry the mixed liquid, to remove moisture of the mixed liquid and form a processed raw material;

a spinning device, comprising a material inlet, a heating area, an electrifying area, and a material outlet, wherein the material inlet is in communication with the stirring device, for the processed raw material to flow to the heating area, the heating area and the electrifying area are disposed between the material inlet and the material outlet, the heating area comprises at least one heater, configured to heat the processed raw material, to make the processed raw material be in a semi-molten state, the electrifying area comprises a plurality of metal sheets, configured to form a magnetic field covering the processed raw material in the semi-molten state after electrification, the material outlet is in communication with a spinning box, and the bottom of the spinning box comprises a spinning plate, configured to extrude at least one fibril;

a stretching device, disposed adjacent to the spinning plate, and comprising a plurality of rollers, configured to stretch the at least one fibril;

a shaping device, disposed adjacent to the stretching device, and configured to perform cooling and shaping on at least one stretched fibril, to form a final fiber product; and an electrical control device, comprising a microcontroller unit, and electrically connected to the stirring device, the drying device, the at least one heater, the plurality of metal sheets, the plurality of rollers, and the shaping device, wherein the microcontroller unit is configured to control a heating temperature of the at least one heater and control a charging wattage and a charging time of the plurality of metal sheets, to convert, after the final fiber product absorbs external energy, the external energy into a far infrared ray in a corresponding wavelength range.

7. The manufacturing system of a fiber according to claim 6, wherein the stirring device comprises a hopper and a mixer, the hopper is configured to pour the plurality of raw materials, the mixer is disposed at the bottom of the hopper and is electrically connected to the microcontroller unit, and the mixer is configured to stir and mix the plurality of raw materials, to form the mixed liquid.

8. The manufacturing system of a fiber according to claim 6, wherein the spinning box further comprises a material injection opening, configured to inject a plurality of TPU colloidal particles into the spinning box.

9. The manufacturing system of a fiber according to claim 6, wherein the charging wattage of the plurality of metal sheets is 1500 watts, and the charging time is at least 24 hours.

* * * * *